United States Patent [19]

Higgins et al.

[11] 3,819,386

[45] June 25, 1974

[54] RHEOLOGY MODIFIERS FOR INKS

[75] Inventors: William Albert Higgins, Gates Mills; Irwin Robert Ehren, Cleveland Heights, both of Ohio

[73] Assignee: The Lubrizol Corporation, Wickliffe, Ohio

[22] Filed: Dec. 20, 1971

[21] Appl. No.: 210,202

[52] U.S. Cl.................. 106/27, 106/31, 106/32, 106/243, 106/268, 106/308 F, 106/308 N, 260/404.5
[51] Int. Cl............................................. C09d 11/06
[58] Field of Search................. 106/27–32, 106/243, 264, 268, 308 F, 308 N, 310, 311, 316, 23, 22; 260/485 R, 28.5 R, 404.5, 404.8, 561 R

[56] References Cited
UNITED STATES PATENTS

| | | | |
|---|---|---|---|
| 2,971,922 | 2/1961 | Clem | 106/23 |
| 3,075,849 | 1/1962 | Dreher et al. | 106/308 N |
| 3,252,820 | 5/1966 | Vignolo et al. | 106/308 F |
| 3,381,022 | 4/1968 | Le Suer | 260/404.8 |
| 3,441,507 | 4/1969 | Schiefer et al. | 106/308 N |
| 3,522,270 | 7/1970 | Glaser | 106/27 |
| 3,590,076 | 6/1971 | Heintzelman et al. | 260/485 R |
| 3,615,809 | 10/1971 | Nagle et al. | 106/308 F |
| 3,617,323 | 11/1971 | Riegler | 106/308 F |
| 3,639,313 | 2/1972 | Gruben et al. | 106/27 |
| 3,728,143 | 4/1973 | Pollard | 106/308 N |

OTHER PUBLICATIONS 3,542,678 (U.S.), 11/70 Bork.
3,272,746 (U.S.) 9/66 Le Suer.
"Castorwax and Other Hydroxy Waxes," in Technical Bulletin, No. 88, pages 8, 9 and 28, The Baker Castor Oil Co., Bayonne, New Jersey, 1966.

*Primary Examiner*—Joseph L. Schofer
*Assistant Examiner*—T. S. Gron
*Attorney, Agent, or Firm*—William H. Pittman; James W. Adams, Jr.

[57] ABSTRACT

A dispersion comprising a non-polar organic liquid, an alkaline earth metal salt of a fatty acid or substituted fatty acid, and a dispersant is effective as a rheology modifier for imparting plastic flow to printing inks. The dispersant is characterized by the presence therein of at least one acyl, acyloxy or acylimidoyl group, typically derived from a carboxylic acid having at least about 50 carbon atoms, and at least one radical containing a nitrogen or oxygen atom connecting said acid-derived group to a hydrocarbon or substituted hydrocarbon radical.

13 Claims, No Drawings

RHEOLOGY MODIFIERS FOR INKS

This invention relates to new compositions of matter adapted to modify the rheology of inks, and more particularly to act as thickeners and to provide plastic flow in said inks. Still more particularly, it relates to dispersions comprising a non-polar organic liquid, an alkaline earth metal salt of a fatty acid or substituted fatty acid, and a dispersant composition characterized by the presence within its structure of (A) at least one acyl, acyloxy or acylimidoyl radical containing at least about 20 carbon atoms, and (B) at least one radical in which a nitrogen or oxygen atom is attached directly to said radical A, said nitrogen or oxygen atom also being attached to a hydrocarbon radical or substituted hydrocarbon radical.

Printing inks employed in letterpress and lithographic printing processes normally contain as essential constituents a varnish (usually a solution of a resin, drying oil or wax in a suitable solvent) and a solid pigment dispersed therein. These are commonly known as "paste inks" because their consistency when at rest is that of a paste rather than a liquid. However, they must be capable of flow when a shearing stress is imposed upon them, in order that they will pass thru the ducts of the printing equipment and onto the printing plate. The type of flow most suitable for an ink of this kind is called "plastic flow" and exists when the applied shearing stress must be greater than a certain minimum value to start the flow. This minimum stress is the "yield value," and at stresses above the yield value the flow is generally Newtonian — that is, the rate of shear is proportional to the shearing stress. Below the yield value, the composition moves by "plug flow" which means simply that the central portion thereof moves as a unit or plug.

Plastic flow can sometimes be provided in an ink by merely varying the proportions of vehicle, pigment, and other constituents. However, it is often desirable to incorporate a rheology-modifying additive which will aid in providing plastic flow.

A principal object of the present invention, therefore, is to provide new compositions of matter suitable for modifying the rheology of paste inks.

A further object is to provide a composition which will impart plastic flow to a paste ink when incorporated therein.

Other objects will in part be obvious and will in part appear hereinafter.

As mentioned hereinabove, the rheology-modifying dispersions of this invention contain three constituents. The first of these is a non-polar organic liquid which may be considered the continuous phase. This liquid is frequently the one used as a solvent in the ink varnish. Typically (and preferably), it is an aliphatic hydrocarbon having a boiling range roughly within the 200°–375°C. area. Also useful are certain aromatic hydrocarbons such as xylene and "aromatic white spirit," which consists mainly of indene, coumarone, mesitylene and durene; turpentine and derivatives thereof; and hydrogenated naphthalenes such as decalin and tetralin.

The second constituent is an alkaline earth metal salt of a fatty acid or substituted fatty acid, which is the disperse or discontinuous phase. It is this constituent that provides the major part of the rheology-modifying properties of the dispersions. The alkaline earth metals suitable for use include magnesium, calcium, strontium and barium, and calcium is preferred because it is readily available and relatively inexpensive.

The term "fatty acid" as used herein referes to acids which may be obtained by hydrolysis of a naturally occurring vegetable or animal fat or oil. These are usually in the $C_{16-20}$ range and include palmitic acid, stearic acid, oleic acid, linoleic acid and the like. Substituted fatty acids are considered fully equivalent to the fatty acids; by "substituted" is meant acids containing substituents which do not alter significantly their character or reactivity. Examples are halide, hydroxy, ether, keto, carboxy, ester (especially lower carbalkoxy), amide, nitro, cyano, sulfoxy and sulfone radicals. Particularly preferred are calcium salts of fatty acids containing hydroxy substituents, such as calcium 12-hydroxystearate.

The third constituent, which serves as a dispersant for the acid salt, is an acylated composition of the type described in U.S. Pat. Nos. 3,272,746; 3,381,022; and 3,542,678. The disclosures of those patents are incorporated by reference herein.

The chemical nature of the dispersant is most conveniently and accurately described in terms of radicals A and B, as defined hereinabove, which are present therein. Radical A is at least one acyl, acyloxy or acylimidoyl radical containing at least about 20 carbon atoms. The structures of these radicals, as defined by the International Union of Pure and Applied Chemistry, are as follows (R' representing a hydrocarbon or other appropriate group):

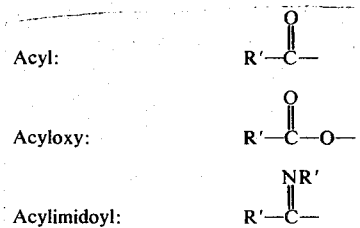

With respect to radical B, the dispersants used in the dispersions of this invention are conveniently classified into "nitrogen-bridged dispersants" and "oxygen-bridged dispersants" wherein the atom attached directly to radical A is nitrogen or oxygen, respectively.

The nitrogen-bridged dispersants, which will be described first, are those disclosed in the above-mentioned U.S. Pat. No. 3,272,746 which also describes a large number of methods for their preparation. The nitrogen-containing group therein is derived from compounds characterized by a radical of the structure

wherein the two remaining valences of nitrogen are satisfied by hydrogen, amino or organic radicals bonded to said nitrogen atom through direct carbon-to-nitrogen linkages. These compounds include aliphatic, aromatic, heterocyclic and carbocylic amines as well as substituted ureas, thioureas, hydrazines, guanidines, amidines, amides, thioamides, cyanamides and the like.

Especially preferred as nitrogen-containing compounds used in the preparation of the nitrogen-bridged dispersants are alkylene polyamines and hydroxyalkyl-substituted alkylene polyamines. The alkylene polyamines comprise, in general, alkylene amines containing about 10 or less alkylene groups joined through nitrogen atoms. They include principally the ethylene amines, propylene amines, butylene amines and homologs thereof, and also piperazines and aminoalkyl-substituted piperazines. Hydroxyalkyl-substituted derivatives of these alkylene polyamines are also contemplated for use in preparing the nitrogen-bridged dispersant. Typical examples of suitable amines are ethylene diamine, triethylene tetramine, pentaethylene hexamine, propylene diamine, tripropylene tetramine, di-(trimethylene) triamine, 1,4-bis-(2-aminoethyl)piperazine, 1-(2-amino-propyl)piperazine, N-(2-hydroxyethyl)ethylene diamine, 1-(2-hydroxyethyl)piperazine, and 2-heptadecyl-1-(2-hydroxyethyl)-imidazoline. Mixtures of these amines may also be used.

The preferred amines are the polyethylene polyamines containing from two to about eight amino groups per molecule. A commercially available mixture of polyethylene polyamines containing an average of about 3–7 amino groups per molecule is particularly suitable.

The acylating agent used for preparing the nitrogen-bridged dispersant is a carboxylic acid-producing compound containing at least about 20 and preferably at least about 50 carbon atoms. By "carboxylic acid-producing compound" is meant an acid, anhydride, acid halide, ester, amide, imide, amidine or the like; the acids and anhydrides are preferred.

The acylating agent is usually prepared by the reaction (more fully described hereinafter) of a relatively low molecular weight carboxylic acid-producing compound with a hydrocarbon source containing at least about 20 carbon atoms. The hydrocarbon source should be substantially saturated, i.e., at least about 95 percent of the total number of carbon-to-carbon covalent linkages should be saturated. It should also be substantially free from pendant groups containing more than about six aliphatic carbon atoms. It may be a substituted hydrocarbon source, with "substituted" having the same meaning given hereinabove with reference to the carboxylic acid salt.

The preferred hydrocarbon sources are those derived from substantially saturated petroleum fractions and olefin polymers, particularly polymers of monoolefins having from 2 to about 30 carbon atoms. Thus, the hydrocarbon source may be derived from a polymer of ethylene, propene, 1-butene, isobutene, 1-octene, 3-cyclohexyl-1-butene, 2-butene, 3-pentene or the like. Also useful are interpolymers of olefins such as those illustrated above with other polymerizable olefinic substances such as styrene, chloroprene, isoprene, p-methylstyrene, piperylene and the like. In general, these interpolymers should contain at least about 80 percent, preferably at least about 95 percent, on a weight basis of units derived from the aliphatic monoolefins.

Another suitable hydrocarbon source comprises saturated aliphatic hydrocarbons such as highly refined high molecular weight white oils or synthetic alkanes.

In many instances, the hydrocarbon source should contain an activating polar radical to facilitate its reaction with the low molecular weight acid-producing compound. The preferred activating radicals are halogen atoms, especially chlorine, but other suitable radicals include sulfide, disulfide, nitro, mercaptan, ketone and aldehyde groups.

As already pointed out, the preferred hydrocarbon sources contain at least about 50 carbon atoms. Thus, among the olefin polymers those having a molecular weight of about 750–5,000 are preferred, although higher polymers having molecular weights from about 10,000 to about 100,000 or higher may sometimes be used. Especially suitable as hydrocarbon sources are isobutene polymers within the prescribed molecular weight range, and chlorinated derivatives thereof.

Any one of a number of known reactions may be employed for the incorporation of the hydrocarbon source into the acid-producing compound to provide the required acylating agent. Thus, an alcohol of the desired molecular weight may be oxidized with potassium permanganate, nitric acid or a similar oxidizing agent; a halogenated olefin polymer may be reacted with a ketene; an ester of an active hydrogen-containing acid, such as acetoacetic acid, may be converted to its sodium derivative and the sodium derivative reacted with a halogenated high molecular weight hydrocarbon such as brominated wax or brominated polyisobutene; a high molecular weight olefin may be ozonized; a methyl ketone of the desired molecular weight may be oxidized by means of the haloform reaction; an organometallic derivative of a halogenated hydrocarbon may be reacted with carbon dioxide; a halogenated hydrocarbon or olefin polymer may be converted to a nitrile, which is subsequently hydrolyzed; or an olefin polymer or its halogenated derivative may undergo an addition reaction with an unsaturated acid or derivative thereof. This latter reaction is preferred, especially where the acid-producing compound is maleic acid or anhydride. The resulting product is then a hydrocarbon-substituted succinic acid or derivative thereof. The reaction leading to its formation involves merely heating the two reactants at about 100°–200°C. The substituted succinic acid or anhydride thus obtained, may, if desired, be converted to the corresponding acid halide by reaction with known halogenating agents such as phosphorus trichloride, phosphorus pentachloride or thionyl chloride.

For the formation of the nitrogen-bridged dispersant, the hydrocarbon-substituted succinic anhydride or acid, or other acylating agent, and the alkylene polyamine are heated to a temperature above about 80°C., preferably about 100°–250°C. The product thus obtained has predominantly amide, imide or amidine linkages (containing acyl or acylamidoyl groups). The process may in some instances be carried out at a temperature below 80°C. to produce a product having predominantly salt linkages (containing acyloxy groups). The use of a solvent such as mineral oil, benzene, toluene, naphtha or the like is often desirable to facilitate control of the reaction temperature.

The relative proportions of the acylating agent and the alkylene polyamine are such that at least about one-half the stoichiometrically equivalent amount of the polyamine is used for each equivalent of acylating agent. In this regard it will be noted that the equivalent weight of the alkylene polyamine is based upon the number of amine radicals therein, and the equivalent weight of the acylating agent is based on the number of acidic or potentially acidic radicals. (Thus, the equivalent weight of a hydrocarbon-substituted succinic acid or anhydride is one-half its molecular weight.) Although a minimum of one-half equivalent of polyamine per equivalent of acylating agent should be used, there does not appear to be an upper limit for the amount of polyamine. If an excess is used, it merely remains in the product unreacted without any apparent adverse effects. Ordinarily, about 1–2 equivalents of polyamine are used per equivalent of acylating agent.

In an alternative method for producing the nitrogen-bridged dispersant, the alkylene polyamine is first reacted with a low molecular weight, unsaturated carboxylic acid-producing compound such as maleic anhydride and the resulting intermediate is subsequently reacted with the hydrocarbon source as previously described.

Oxygen-bridged dispersants comprise the esters of the above-described carboxylic acids, as described in the aforementioned U.S. Pat. Nos. 3,381,022 and 3,542,678. As such, they contain acyl or, occasionally, acylimidoyl radicals as radical A. (An oxygen-bridged dispersant containing an acyloxy radical as radical A would be a peroxide, which is unlikely to be stable under all conditions of use of the dispersions of this invention.) These esters are preferably prepared by conventional methods, usually the reaction (frequently in the presence of an acidic catalyst) of the carboxylic acid-producing compound with an aliphatic compound such as a monohydric or polyhydric alcohol or with an aromatic compound such as a phenol or naphthol. The preferred hydroxy compounds are alcohols containing up to about 40 aliphatic carbon atoms. These may be monohydric alcohols such as methanol, ethanol, isooctanol, dodecanol, cyclohexanol, neopentyl alcohol, monomethyl ether of ethylene glycol and the like, or polyhydric alcohols including ethylene glycol, diethylene glycol, dipropylene glycol, tetramethylene glycol, pentaerythritol, glycerol and the like. Carbohydrates (e.g., sugars, starches, cellulose) are also suitable as are partially esterified derivatives of polyhydric alcohols having at least three hydroxy radicals.

The reaction is usually effected at a temperature above about 100°C. and typically at 150°–300°C. The esters may be neutral or acidic; or may contain unesterified hydroxy groups, according as the ratio of equivalents of acid-producing compound to hydroxy compound is equal to, greater than or less than 1:1.

Typical dispersant compositions suitable for use in the dispersions of this invention are listed in the following table. "Reagent A" and "Reagent B" are, respectively, the sources of radicals A and B as previously defined.

| Example | Reagent A | Reagent B | Ratio of equivalents, A:B | Reaction temperature °C. | Diluent |
|---|---|---|---|---|---|
| 1 | Polyisobutenyl (mol. wt. about 900) succinic anhydride prepared from chlorinated polyisobutene | Polyethylene amine mixture containing about 3–7 amino groups per molecule | 0.48 | 150 | Mineral oil |
| 2 | Same as Example 1 | Pentaethylene hexamine | 0.41 | 150 | Mineral oil |
| 3 | Like Example 1 except polyisobutene mol. wt. is about 1050 | Pentaethylene hexamine | 0.61 | 150 | Mineral oil |
| 4 | Like Example 1, except polyisobutene mol. wt. is about 850 | Diethylene triamine | 1.0 | 150 | Mineral oil |
| 5 | Same as Example 4 | Ethylene diamine | 1.0 | 150 | Mineral oil |
| 6 | Same as Example 4 | Di-(1,2-propylene)triamine | 1.0 | 180–190 | Mineral oil-toluene |
| 7 | Same as Example 4 | N-(2-hydroxyethyl)-trimethylene diamine | 1.06 | 150–155 | Mineral oil |
| 8 | Tetrapropenyl succinic anhydride | Triethylene tetramine | 1.0 | 155 | Toluene |
| 9 | Same as Example 1 | | 0.67 | 150 | Mineral oil |
| 10 | Same as Example 3 | Same as Example 1 | 1.0 | 150 | Mineral oil |
| 11 | $C_{6-8}$ olefin polymer (mol. wt. about 1800)-substituted succinic anhydride | Pentaethylene hexamine | 0.8 | 150 | Mineral oil |
| 12 | Isostearic acid | Pentaethylene hexamine | 0.8 | 150 | Mineral oil |
| 13 | Acid produced by reaction of chlorinated (3.6%Cl) polyisobutene (mol. wt. 750) with KCN, followed by hydrolysis | Ethylene diamine | 2.0 | 150 | Xylene |
| 14 | Methyl ester produced by reaction of chlorinated (4.7%Cl) polyisobutene mol. wt. 1000) with methyl methacrylate | Triethylene tetramine | 1.0 | 140–220 | — |
| 15 | Reaction product of sodio-malonic ester with $C_{75}$ brominated wax | Same as Example 1 | 0.4 | 150 | Xylene |
| 16 | Reaction product of chlorinated (4.5%Cl) polyisobutene (mol. wt. 850) with acrylic acid | Pentaethylene hexamine | 0.8 | 180–200 | — |
| 17 | Acid produced by haloform reaction with methyl heptacontanyl ketone | Same as Example 1 | 0.8 | 180–210 | — |
| 18 | Like Example 1, except polyisobutene mol. wt. is about 1100 | Pentaerythritol | 0.5 | 150–210 | Mineral oil |
| 19 | Like Example 1, except polyisobutene mol. wt. is about 1000 | Neopentyl glycol | 1.0 | 240–250 | — |

—Continued

| Example | Reagent A | Reagent B | Ratio of equivalents, A:B | Reaction temperature °C. | Diluent |
|---|---|---|---|---|---|
| 20 | Same as Example 19 | Methanol* | Excess methanol | 50–65 | Toluene |
| 21 | Same as Example 19 | Polyethylene glycol (mol. wt. about 600) | 2.0 | 240–250 | — |
| 22 | Same as Example 19 | Oleyl alcohol** | 1.0 | 150–173 | Xylene |
| 23 | Like Example 16, except polyisobutene mol. wt. is about 982 | Sorbitol | 0.48 | 115–205 | Mineral oil |
| 24 | Same as Example 23 | Pentaerythritol | 1.0 | 180–205 | — |
| 25 | Reaction product of polyisobutene (mol. wt. 1500) with chloroacetyl chloride | Mannitol | 0.33 | 115–205 | Mineral oil |

\* Hydrogen chloride catalyst
\*\*p-Toluenesulfonic acid catalyst

The dispersions of this invention may be prepared by merely blending the above-described constituents so as to form a uniform mixture. Because the product is usually gellike in consistency and thorough blending may be difficult, it is frequently preferred to employ a diluent during preparation in order to insure uniformity. It may also be advantageous to heat the mixture during preparation, usually at about 60°–150°C. although temperatures above 100°C. are seldom required. In a preferred method for making the dispersions, the fatty acid salt is first prepared by reaction of the acid with an alkaline earth metal base in a relatively volatile inert diluent, typically an aliphatic or aromatic hydrocarbon boiling below about 150°C., and the non-polar liquid and dispersant are subsequently added after which the diluent is removed by evaporation.

The dispersions of this invention generally contain about 10–30 parts by weight of each of the fatty acid salt and dispersant per 100 parts of total dispersion. The indicated amount of dispersant is exclusive of diluents (e.g., mineral oil) which may be present.

The following examples illustrate the preparation of the dispersions of this invention. All parts are by weight.

EXAMPLE 26

A mixture of 5 parts of calcium 12-hydroxystearate, 9 parts of an aliphatic petroleum fraction boiling at about 240°–260°C., and 9 parts of the product of Example 1 is heated for about one hour, with vigorous stirring, to a maximum temperature of 82°C. When the temperature reaches about 65°C. the sample begins to thicken, and after the indicated agitation time it is quite thick. It is then cooled to 54°C. and passed through a three-roll mill twice to insure uniformity. The product thus obtained is the desired dispersion.

EXAMPLE 27

A solution of 600 parts (2 equivalents) of 12-hydroxystearic acid in 900 parts of xylene is heated under nitrogen to 96°C., with stirring, and 20 parts of water is added followed by a suspension of 74 parts (2 equivalents) of calcium hydroxide in 500 parts of xylene. The latter is added slowly over 1 hour. An additional 1200 parts of xylene is added and heating is continued at 96°C. for 2 hours, with stirring. There is then added 1160 parts of the aliphatic hydrocarbon fraction of Example 26, after which xylene and water are removed by vacuum stripping at 96°C. When 650 parts of xylene have been distilled, 1,160 parts of the product of Example 1 (containing 696 parts of the dispersant) is added, with stirring. The mixture thickens as xylene removal is continued by heating to 195°C., and "sets" into a gel-like mass as cooling proceeds. Upon cooling to room temperature, the desired product is obtained; it contains 1.04% nitrogen and 1.4% calcium.

EXAMPLE 28

Five parts of calcium 12-hydroxystearate is suspended in xylene and combined with 9 parts each of the aliphatic hydrocarbon of Example 26 and the product of Example 18, following substantially the procedure of Example 27. A similar product is obtained.

Suitable components for the printing inks in which the dispersions of this invention are used are well known in the art and are disclosed, for example, in Apps, *Printing Ink Technology* (New York: Chemical Publishing Co., 1959). Illustrative of varnishes are solutions in various solvents (described hereinafter) of drying oils such as linseed oil, tung oil, dehydrated castor oil, perilla oil, oiticica oil, stillingia oil, soybean oil, sunflower oil, tobacco seed oil and the like; of fatty acids derived from said oils; of natural resins such as copals, resins, shellacs, asphalts, pitches and the like; of synthetic resins such as alkyds, maleic resins, phenolic resins, vinyl resins, acrylic resins, coumarone-indene resins, urea-formaldehyde resins, melamine-formaldehyde resins, silicones, epoxy resins, cellulose nitrate, cellulose acetate, cellulose ethers and the like; and of waxes such as paraffin wax, microcrystalline wax, montan wax, carnauba wax, beeswax, lanolin, polyethylene waxes, etc.

The solvents for use in the varnish are preferably non-polar solvents such as those listed above as non-polar organic liquids suitable for use in the dispersions of this invention, but may also be alcohols, ethers, ketones, esters and the like.

Suitable pigments include both inorganic and organic pigments. Illustrative of the many inorganic pigments which may be used are titanium dioxide, white lead, zinc oxide, antimony white, chalk, mica, silica, ultramarine, lead chrome, zinc chrome, red lead, iron oxide pigments and carbon black. The organic pigments comprise many of the conventional dyes which are well known in the art.

In addition to the varnish and pigment, the ink may also contain ingredients such as tackifiers, driers, antioxidants, surface-active agents, adhesives, plasticizers and the like. It is frequently preferred to combine a tackifier with the dispersion of this invention and add it to the otherwise completely formulated ink to form the desired ink composition.

The inks contemplated as being part of this invention generally comprise the above-noted conventional constituents and, in combination therewith, the dispersion of this invention in a minor amount suitable to provide the desired rheological properties (usually plastic flow). The amount required is generally about 5–25 and preferably about 10–20 parts of the dispersion per 100 parts of varnish.

What is claimed is:

1. An ink comprising a varnish, a pigment, and, as a rheology modifier, a dispersion comprising a non-polar organic liquid, an alkaline earth metal salt of a fatty acid or hydroxy-substituted fatty acid, and a dispersant composition characterized by the presence within its structure of (A) a substantially saturated hydrocarbon-substituted or halohydrocarbon-substituted acyl, acyloxy or acylimidoyl group wherein the substituent contains at least about 50 aliphatic carbon atoms, and (B) a radical in which a nitrogen or oxygen atom is attached directly to said acyl, acyloxy or acylimidoyl group, said nitrogen or oxygen atom also being attached to a hydrocarbon radical or a hydroxy- or amino-substituted hydrocarbon radical; about 5–25 parts by weight of said dispersion being present per 100 parts of said varnish.

2. An ink according to claim 1 wherein the alkaline earth metal is calcium.

3. An ink according to claim 2 wherein the salt is a calcium salt of a hydroxystearic acid.

4. An ink according to claim 3 wherein the hydroxystearic acid is 12-hydroxystearic acid.

5. An ink according to claim 4 wherein radical B is attached through nitrogen to radical A.

6. An ink according to claim 5 wherein radical B is an alkylene polyamine radical.

7. An ink according to claim 5 wherein radical A is a hydrocarbon-substituted succinic acid radical.

8. An ink according to claim 7 wherein the hydrocarbon substituent is a polyisobutenyl radical.

9. An ink according to claim 8 wherein radical B is an alkylene polyamine radical.

10. An ink according to claim 9 wherein the alkylene polyamine is an ethylene polyamine.

11. An ink according to claim 10 wherein the hydroxystearic acid is 12-hydroxystearic acid.

12. An ink according to claim 11 wherein the non-polar organic liquid is an aliphatic hydrocarbon.

13. An ink according to claim 12 wherein the aliphatic hydrocarbon has a boiling range of about 240°–260°C.

* * * * *